United States Patent [19]

Robertson

[11] 4,114,768
[45] Sep. 19, 1978

[54] CONTAINER COMPANION PLATE

[76] Inventor: Donald Keir Robertson, 128 Lawrence Street, Bedford Park, Perth, Western Australia, Australia, 6052

[21] Appl. No.: 811,397

[22] Filed: Jun. 29, 1977

[51] Int. Cl.² .............................................. B60P 1/64
[52] U.S. Cl. ................................. 214/152; 214/38 CB
[58] Field of Search ................ 214/38 CB, 38 D, 515, 214/152, 38 R, 38 C

[56] References Cited

U.S. PATENT DOCUMENTS

| | | | |
|---|---|---|---|
| 2,720,324 | 10/1955 | Cosentino | 214/38 CB |
| 3,206,053 | 9/1965 | Bridge | 214/38 D X |

Primary Examiner—Albert J. Makay
Attorney, Agent, or Firm—William Anthony Drucker

[57] ABSTRACT

A container companion plate comprising a substantially longitudinal member which is provided at each extremity with an internally mounted extension arm, said longitudinal member having one or more container engaging means provided on its upper surface and one or more vehicle lock receiving means provided in its lower surface.

3 Claims, 11 Drawing Figures

CONTAINER COMPANION PLATE

This invention relates to the movement of containers from the tray of transport vehicles to a fixed mounting such as a stand or loading ramp.

In particular the invention relates to a plate member which lies transverse to the longitudinal length of the vehicle tray and which may positively engage with the vehicle tray and the container, is, for convenience referred to throughout the specification as a container companion plate.

The current procedure for transferring containers from the tray or chassis of vehicles is by large fork lifts, cranes or gantries. These devices are cumbersome, not always available and very expensive to have on hand for several minutes work in unloading a container. Because of the high cost involved in the provision of lifting devices it is standard practice to leave the container on the vehicle while loading or unloading of the container takes place. This incurs high costs from vehicle and driver waiting times. An alternative method is to provide a prime mover with a number of trailers which can be left at the loading and unloading stations. Once again however, this involves large amounts of capital expenditure to purchase a suitable number of trailers.

One of the objects of this invention is to provide a vehicle, a container companion plate and a method incorporating the two whereby containers can be effectively placed on and removed from the tray or chassis of vehicles at minimum time and cost.

In one form the invention resides in a container companion plate comprising a substantially longitudinal member which is provided at each extremity with an internally mounted extension arm, said longitudinal member having one or more container engaging means provided on its upper surface and one or more vehicle lock receiving means provided in its lower surface.

In another form the invention resides in a method of loading an elevated container onto the tray or chassis of a vehicle wherein said chassis is downwardly inclined towards the rear and is provided on its upper surface with a skate member, said skate member being adapted to travel along the chassis or on longitudinal tracks provided on the tray of the vehicle, said vehicle being reversed under the elevated container until a container companion plate mounted to the leading underside of the container engages with the skate member, the continual reversal and incline of the vehicle tray lifts the container clear of the leading supports, the skate member and leading companion plate travel along the longitudinal tracks provided and positively engage with locking means at the forward end of the tray, hydraulic jacks provided in the rear portion of the tray lift a container companion plate attached to the trailing underside of the container and lower it into a locked position on the rear of the vehicle tray.

The invention will be better understood by reference to the following description of one specific embodiment as shown in the accompanying drawings wherein.

Figure 1:
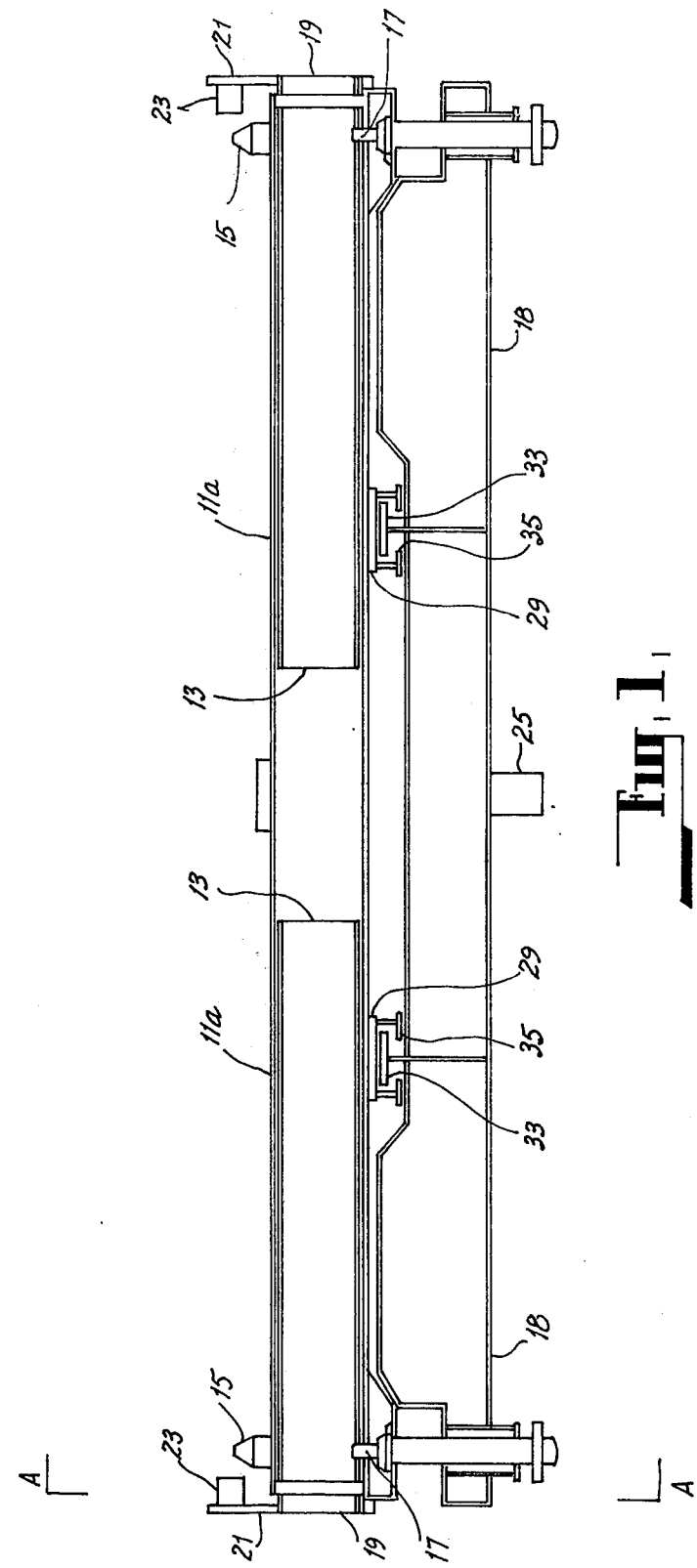
FIG. 1 is a sectional end elevation showing the container companion plate locked on the vehicle chassis.
Figure 2:
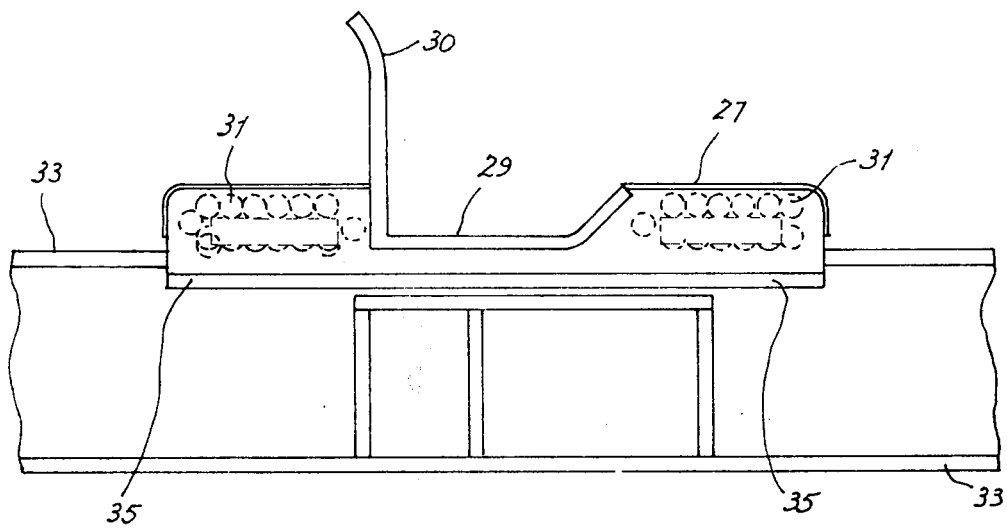
FIG. 2 is a sectional side elevation of the skate member.
Figure 3:
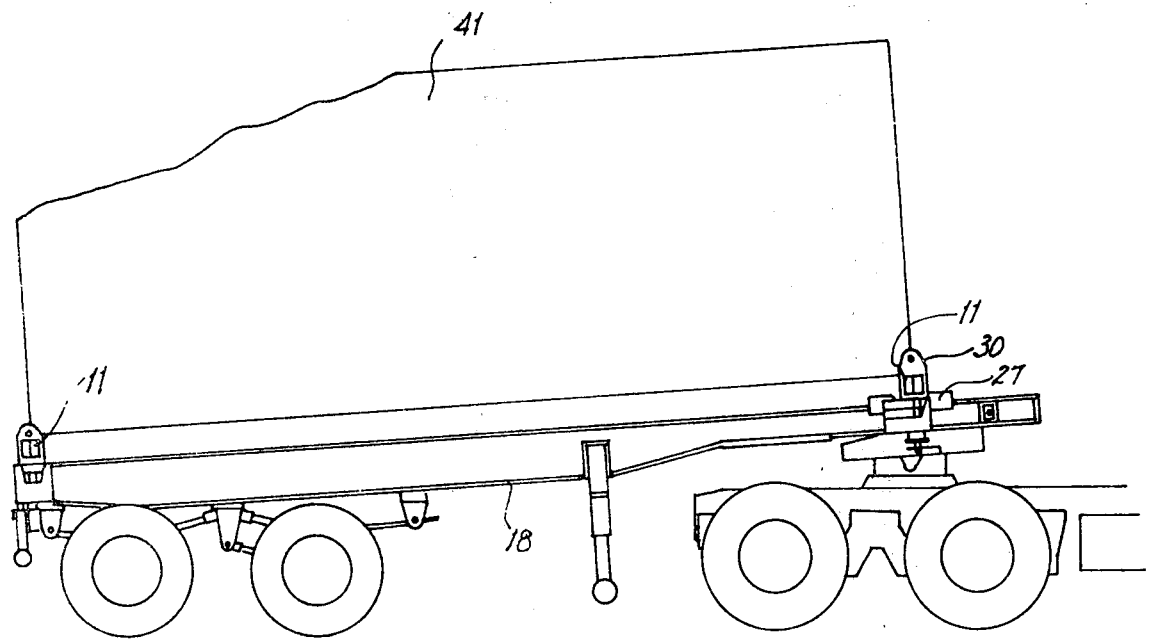
FIG. 3 is a longitudinal elevation from the drivers side showing the container companion plates and skate member in the locked or travelling position.
Figure 4:
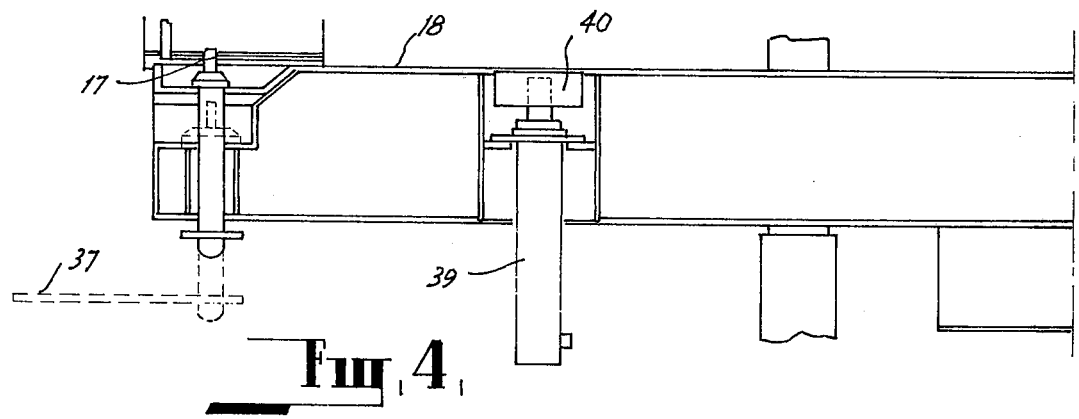
FIG. 4 is a sectional rear elevation illustrating the companion plate locking means and hydraulics situated in the rear of the vehicle tray.
Figure 5:
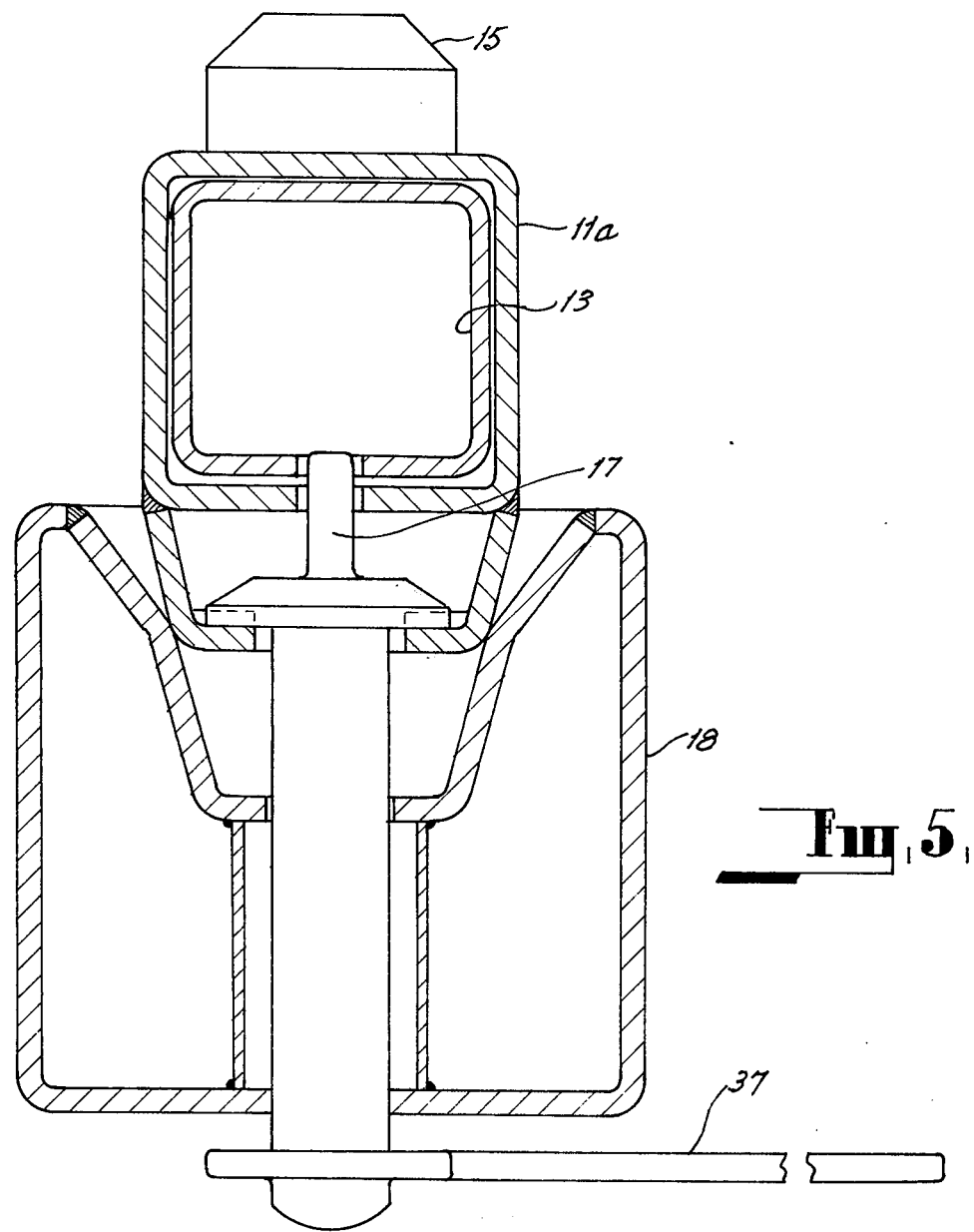
FIG. 5 is a sectional side elevation of FIG. 4.
Figure 6:
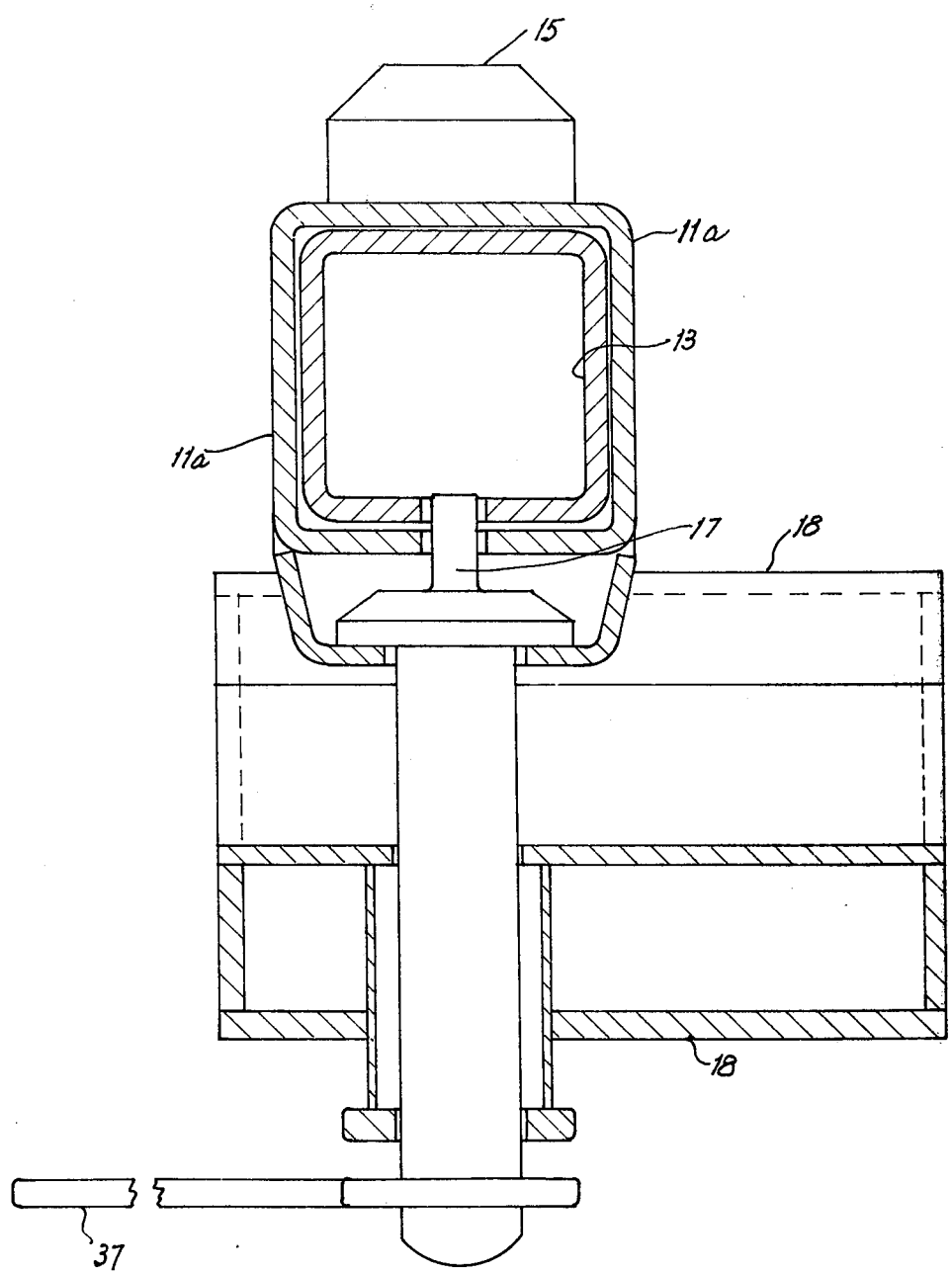
FIG. 6 is a sectional side elevation of FIG. 1 taken on the lines A—A.
Figure 7:
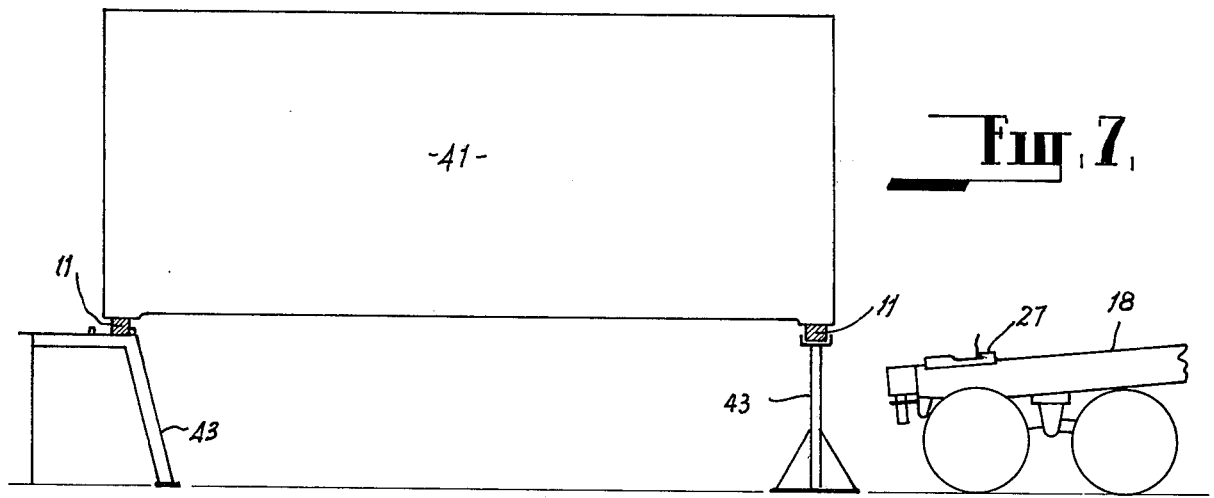
FIGS. 7, 8, 9, 10 and 11 illustrate diagrammatically the steps and actions involved in loading a container.
Figure 8:
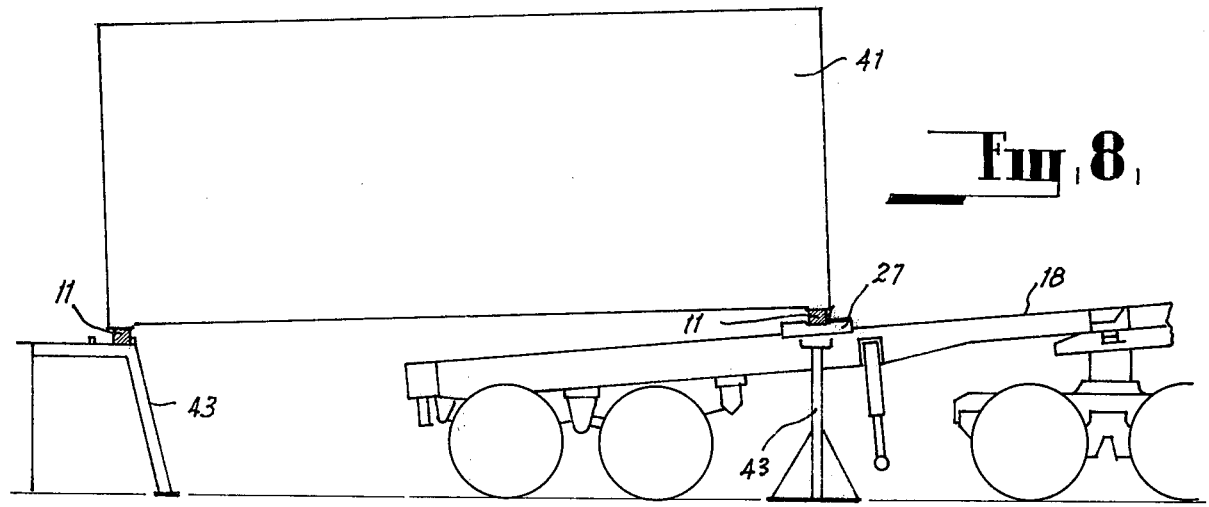

In this embodiment a container companion plate 11 is constructed comprising a substantially longitudinal member 11A, provided at each extremity with an internally mounted extension arm 13. The upper surface of the longitudinal member 11A is provided with conventional container twist locks or pins 15. The lower surface or underside of the longitudinal member is provided with a suitable recess to receive locking pins 17 provided in the chassis 18 of the vehicle. The locking pins 17 also pass into a recess provided in extension arms 13 to prevent their movement during transportation. The outermost face 19 of the extension arms 13 are provided with an upright member 21 onto which is secured pin 23. Extending either side of the central chassis member 25 is skate member 27. The skate member 27 being provided with a container companion plate support 29 and constructed with suitable bearings or rollers 31 to enable the skate member to freely move along chassis members 33. Inwardly projecting shoulders 35 are provided on the base of the skate member to ensure that it remains on the chassis members 33. The leading end (drivers end) of the vehicle is provided with container companion plate locking means as provided at the rear of the vehicle i.e. once in position pins 17 engage in the recess provided in member 11A and extension arm 13. Both front and rear set of pins 17 being operated by handles 37. The rear of the vehicle chassis 18 is provided on either side with a hydraulic ram 39 which, when not in use rests below the upper chassis surface.

Figure 9:
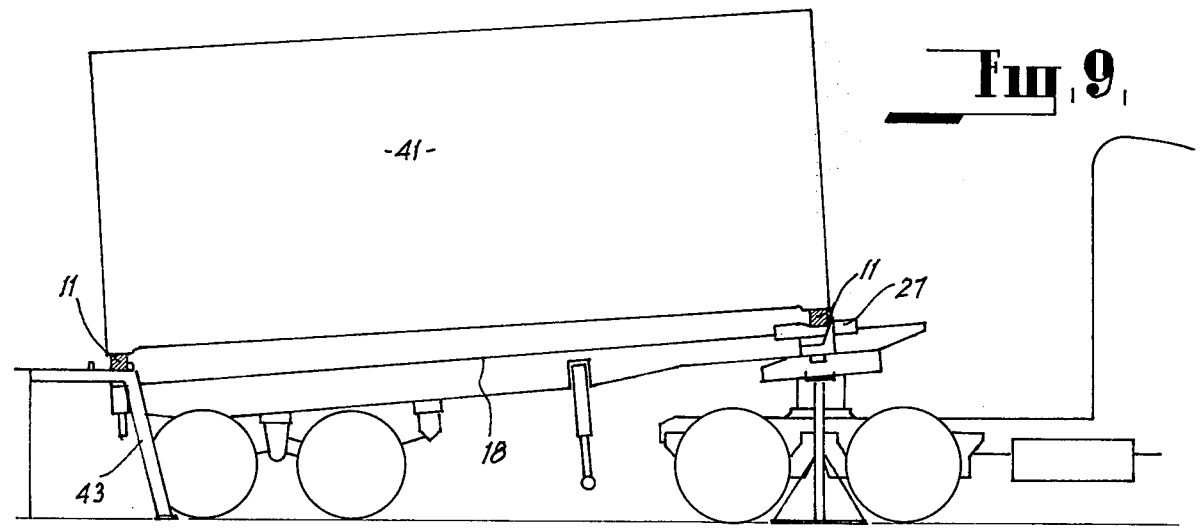
Figure 10:
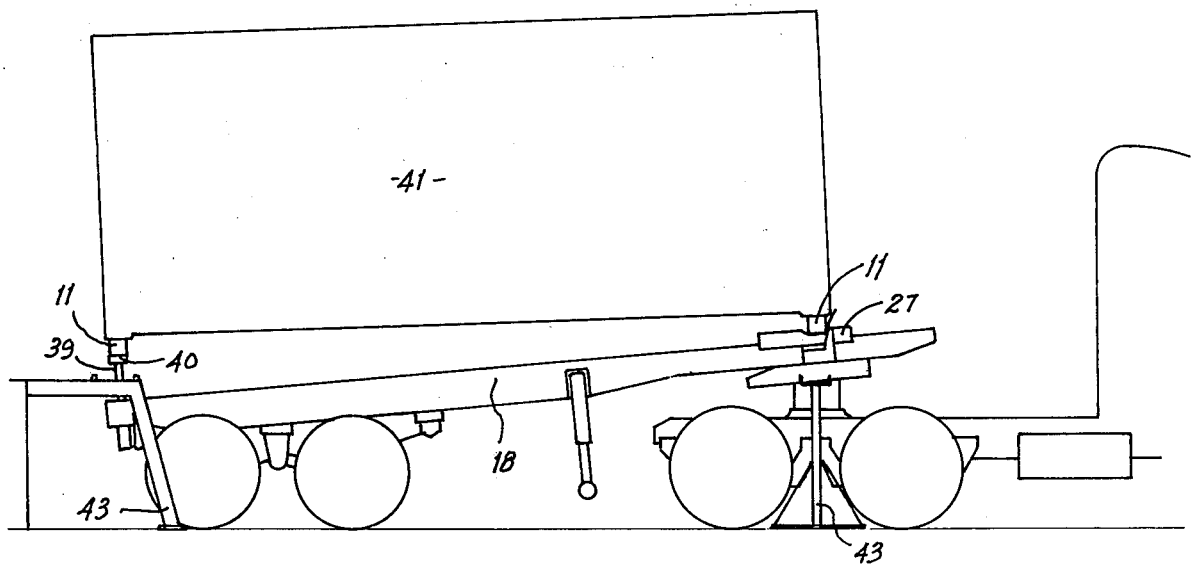
Figure 11:
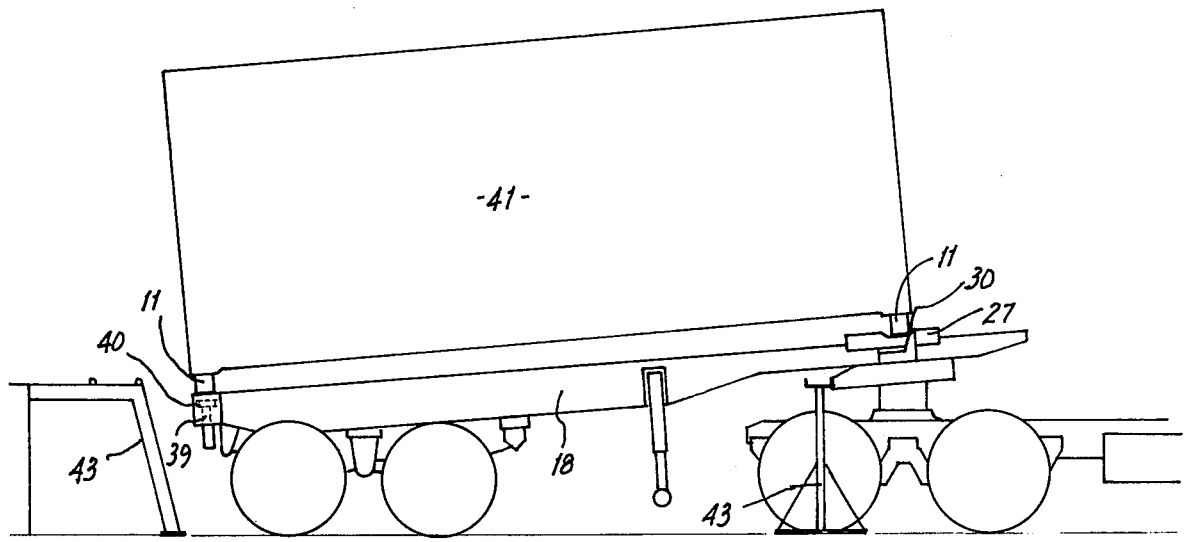

In use, reference will be made to the steps diagrammatically shown in FIGS. 7, 8, 9, 10 and 11 which illustrate the loading of a container onto a vehicle. The container 41 left at a dock in an elevated position on stands 43 or the like for loading and/or unloading purposes has secured to its leading and trailing underside a container companion plate 11. The extension arms 13 of both companion plates 11 are extended and rest upon stands 43. The lower rear portion of the vehicle tray is reversed under container 41 and between the leading stands 43 until the skate member 27 comes in contact with the leading companion plate 11. Continual reversal of the vehicle causes the leading companion plate to be supported on plate 29 of the skate 27. Arm 30 on the skate prevents the companion plate from passing over the top of the skate member should the vehicle tray be a little low or the stand 43 a little too high. The skate member 27 travels along the chassis of the vehicle until it positively engages with locking means provided at the forward end of the chassis as shown in FIG. 9 of the drawings. At this particular point the tail or rear of the vehicle is directly below the container companion plate which is attached to the container 41. The hydraulic rams 39 are activated and the heads 40 of the rams, apply pressure to the longitudinal member 11A of the container companion plate lifting the companion plate and container clear of the support stand 43. The extension arms 13 that were resting on the stands are retracted with pins 23 engaging in the recesses provided on the containers as the container is lowered onto the tray of the vehicle. The originally extended arms on the leading companion plate also having been retracted with pins 23 engaged in the container. In this position pins 17 are then turned so that they lock the container companion plates to the vehicle. Preferably a micro switch will be installed at the leading end of the chassis and positioned such that the hydraulic rams could not be activated until the forward or leading companion plate was safely secured. Unloading of a container is obviously the reverse procedure to loading a container.

While the invention has been illustrated and described with reference to one specific embodiment, it is recognized that variations and changes may be made therein without departing from the invention as set out in the claims.

I claim:

1. A method of loading a front and rear supported elevated container onto the tray or chassis of a vehicle including; inclining said chassis downwardly towards the rear, providing a skate member on its upper surface, said skate member being adapted to travel along the chassis or on longitudinal tracks provided on the tray of the vehicle, reversing said vehicle under the elevated container until a container companion plate mounted to the leading underside of the container engages with the skate member, the continual reversal and incline of the vehicle tray lifts the container clear of the front supports, the skate member and leading companion plate travel along the longitudinal tracks provided and positively engage with locking means at the forward end of the tray, providing hydraulic jacks at the rear portion of the tray, lifting a second container companion plate attached to the trailing underside of the container free of the rear supports and lowering it into a locked position on the rear of the vehicle tray.

2. A method of loading an elevated container onto the tray or chassis of a vehicle as claimed in claim 1 wherein the incline of the said tray may be adjustable by hydraulic or gas means.

3. A method of loading an elevated container onto the tray or chassis of a vehicle as claimed in claim 1, further providing said skate member with an upwardly projecting arm to prevent the container companion plate from passing over the top of the skate member should the vehicle level be too low or the stand supporting the container be too high.

* * * * *